(12) United States Patent
Son et al.

(10) Patent No.: US 12,020,710 B2
(45) Date of Patent: Jun. 25, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Yusun Son, Suwon-si (KR); Hyungjun Choi, Suwon-si (KR); Jiwon Hyung, Suwon-si (KR); Jongyoub Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 356 days.

(21) Appl. No.: 17/573,103

(22) Filed: Jan. 11, 2022

(65) Prior Publication Data

US 2022/0284905 A1   Sep. 8, 2022

Related U.S. Application Data

(63) Continuation of application No. PCT/KR2021/017328, filed on Nov. 24, 2021.

(30) Foreign Application Priority Data

Mar. 5, 2021   (KR) .................. 10-2021-0029692

(51) Int. Cl.
*G10L 15/22* (2006.01)
*G10L 15/26* (2006.01)
(52) U.S. Cl.
CPC .............. *G10L 15/26* (2013.01); *G10L 15/22* (2013.01); *G10L 2015/223* (2013.01)
(58) Field of Classification Search
CPC .... G10L 15/22; G10L 15/26; G10L 2015/223
See application file for complete search history.

(56) References Cited

U.S. PATENT DOCUMENTS 5,850,627 A * 12/1998 Gould .................. G10L 15/285
704/E15.04
10,853,100 B1   12/2020 Kathpalia et al.
(Continued)

FOREIGN PATENT DOCUMENTS

CN          110334242       10/2019
JP          2017-167367     9/2017
(Continued)

OTHER PUBLICATIONS

Search Report and Written Opinion dated Mar. 4, 2022 in counterpart International Patent Application No. PCT/KR2021/017328.

*Primary Examiner* — Daniel C Washburn
*Assistant Examiner* — Oluwadamilola M Ogunbiyi
(74) *Attorney, Agent, or Firm* — Nixon & Vanderhye, P.C.

(57) ABSTRACT

An electronic apparatus is disclosed. The electronic apparatus includes: a memory storing task information and keyword information regarding a voice recognition agent function related to execution of an application, and a processor connected with the memory and configured to control the electronic apparatus. The processor may be configured to: apply a first weight to first step information including the keyword information among a plurality of step information included in the task information, apply a second weight different from the first weight to second step information including a motion among the plurality of step information, update the task information based on the first step information to which the first weight was applied and the second step information to which the second weight was applied, and based on a voice command for the application being input, execute the voice recognition agent function based on the updated task information.

20 Claims, 10 Drawing Sheets

(56) References Cited

U.S. PATENT DOCUMENTS

| | | | |
|---|---|---|---|
| 10,978,068 B2 | 4/2021 | Kim et al. | |
| 11,100,916 B2 | 8/2021 | Lee | |
| 11,328,725 B2 | 5/2022 | Yae | |
| 11,423,880 B2 | 8/2022 | Chen | |
| 2002/0065842 A1 | 5/2002 | Takagi et al. | |
| 2006/0153345 A1* | 7/2006 | Bushey | G10L 15/26 |
| | | | 379/88.01 |
| 2009/0049389 A1 | 2/2009 | Kuzmanovic | |
| 2009/0055185 A1* | 2/2009 | Nakade | G10L 15/30 |
| | | | 704/E15.001 |
| 2013/0227419 A1 | 8/2013 | Lee et al. | |
| 2014/0012582 A1* | 1/2014 | Ganong, III | G10L 15/01 |
| | | | 704/E15.001 |
| 2014/0114889 A1* | 4/2014 | Dagum | A61B 5/0022 |
| | | | 706/12 |
| 2014/0163976 A1* | 6/2014 | Park | G10L 25/78 |
| | | | 704/231 |
| 2014/0267022 A1* | 9/2014 | Kim | G06F 3/01 |
| | | | 345/156 |
| 2015/0317837 A1* | 11/2015 | Sholudko | G06F 3/167 |
| | | | 345/633 |
| 2017/0140755 A1* | 5/2017 | Andreas | G06F 40/35 |
| 2017/0270094 A1 | 9/2017 | Shimagori | |
| 2018/0263833 A1* | 9/2018 | Pham | A61G 9/003 |
| 2018/0308480 A1* | 10/2018 | Jang | G06F 3/0484 |
| 2019/0114572 A1* | 4/2019 | Gold | G10L 15/26 |
| 2019/0172444 A1* | 6/2019 | Hiroe | G10L 15/10 |
| 2020/0020324 A1* | 1/2020 | Itoh | G10L 15/26 |
| 2020/0160838 A1 | 5/2020 | Lee | |
| 2020/0265065 A1* | 8/2020 | Ashe | G06F 16/90332 |
| 2020/0311210 A1* | 10/2020 | Nama | G06F 40/289 |
| 2020/0402508 A1* | 12/2020 | Thomas | H04N 1/00403 |
| 2021/0350792 A1 | 11/2021 | Lee | |
| 2022/0297304 A1* | 9/2022 | Stramandinoli | B25J 9/163 |

FOREIGN PATENT DOCUMENTS

| | | |
|---|---|---|
| KR | 10-2013-0097433 | 9/2013 |
| KR | 10-1348645 | 12/2013 |
| KR | 10-2016-0016491 | 2/2016 |
| KR | 10-2017-0079423 | 7/2017 |
| KR | 10-2019-0051215 | 5/2019 |
| KR | 10-2020-0059703 | 5/2020 |
| KR | 10-2020-0094829 | 8/2020 |

* cited by examiner

ELECTRONIC APPARATUS AND CONTROLLING METHOD THEREOF

CROSS-REFERENCE TO RELATED APPLICATIONS

This application is a continuation of International Application No. PCT/KR2021/017328 designating the United States, filed on Nov. 24, 2021, in the Korean Intellectual Property Receiving Office and claiming priority to Korean Patent Application No. 10-2021-0029692, filed on Mar. 5, 2021, in the Korean Intellectual Property Office, the disclosures of which are incorporated by reference herein in their entireties.

BACKGROUND

Field

The disclosure relates to an electronic apparatus that optimizes a task of performing a function of an application, and a controlling method thereof.

Description of Related Art

Recently, technologies regarding a method of providing a voice recognition agent service through a mobile electronic apparatus are being actively developed. An electronic apparatus providing a speech recognition agent service may perform a function of an application installed on the electronic apparatus based on a user's command. In case the electronic apparatus performs a function of a specific application through a plurality of steps set by a user, even if some unnecessary steps are included in the plurality of steps set by the user, the function of the application is performed through these steps, and thus there is a problem that unnecessary time and power, etc. are wasted. Accordingly, there has been a continuous demand for a method for a voice recognition agent to perform a function of an application without going through some unnecessary steps among a plurality of steps set by a user.

SUMMARY

Embodiments of the disclosure address the aforementioned need, and provide an electronic apparatus that analyzes a keyword including a user's utterance and the user's motion, and updates task information regarding a voice recognition agent function based on the analyzed result, and a controlling method thereof.

An electronic apparatus according to an example embodiment of the disclosure includes: a memory storing task information and keyword information regarding a voice recognition agent function related to execution of an application, and a processor connected with the memory and configured to control the electronic apparatus. The processor may be configured to: apply a first weight to first step information including the keyword information among a plurality of step information included in the task information, apply a second weight different from the first weight to second step information including a motion among the plurality of step information, update the task information based on the first step information to which the first weight was applied and the second step information to which the second weight was applied, and based on a voice command for the application being input, execute the voice recognition agent function based on the updated task information.

The processor may be configured to: apply the second weight to the second step information including a motion of a first type among the plurality of step information, and apply a third weight different from the second weight to third step information including a motion of a second type different from the first type among the plurality of step information.

The processor may, based on the second weight applied to the second step information being less than a threshold numerical value, be configured to: exclude the second step information from the task information, and based on the second weight applied to the second step information being greater than or equal to the threshold numerical value, maintain the second step information in the task information.

The processor may, after excluding the second step information from the task information, be configured to: identify whether a task is performed normally, and based on the task being performed normally, exclude the second step information from the task information.

The processor may, based on the task not being performed normally in a state wherein the second step information has been excluded from the task information, be configured to: maintain the second step information and exclude step information different from the second step information from the task information, and identify whether the task is performed normally. The other step information different from the second step information may include step information including a motion of a different type from the type of the motion corresponding to the second step information.

The processor may, based on the task not being performed normally in a state wherein the second step information has been excluded from the task information, be configured to: maintain the second step information and preferentially exclude step information to which a relatively low weight was applied among the plurality of step information different from the second step information from the task information, and identify whether the task is performed normally.

The processor may, based on the task not being performed normally in a state wherein only the second step information has been excluded from the task information, be configured to: exclude the second step information and step information related to the second step information from the task information, and identify whether the task is performed normally. The other step information related to the second step information may include step information including a motion of the same type as the type of the motion corresponding to the second step information.

The processor may be configured to: identify a fourth weight based on the type of the motion corresponding to the first step information, and apply the first weight and the fourth weight to the first step information.

The processor may be configured to: maintain preset essential step information among the plurality of step information in the task information and update the task information.

The motion may include at least one of: a scroll motion, a button click motion, an image click motion, a typing motion, or an application execution motion.

A method of controlling an electronic apparatus according to an example embodiment of the disclosure may include: applying a first weight to first step information including the keyword information among a plurality of step information included in the task information, applying a second weight different from the first weight to second step information including a motion among the plurality of step information, updating the task information based on the first step information to which the first weight was applied and the second step information to which the second weight was applied, and based on a voice command for the application being input, executing the voice recognition agent function based on the updated task information.

The operation of applying the second weight may include: applying the second weight to the second step information including a motion of a first type among the plurality of step information, and applying a third weight different from the second weight to third step information including a motion of a second type different from the first type among the plurality of step information.

The operation of applying the second weight may, based on the second weight applied to the second step information being smaller than a threshold numerical value, include: excluding the second step information from the task information, and based on the second weight applied to the second step information being greater than or equal to the threshold numerical value, maintaining the second step information in the task information.

The operation of updating the task information may, after excluding the second step information from the task information, include: identifying whether a task is performed normally, and based on the task being performed normally, excluding the second step information from the task information.

The operation of updating the task information may, based on the task not being performed normally in a state wherein the second step information has been excluded from the task information, include: maintaining the second step information and exclude step information different from the second step information from the task information, identifying whether the task is performed normally. The other step information different from the second step information may include step information including a motion of a different type from the type of the motion corresponding to the second step information.

The operation of identifying whether the task is performed normally may, based on the task not being performed normally in a state wherein the second step information has been excluded from the task information, include: maintaining the second step information and preferentially excluding step information to which a relatively low weight was applied among the plurality of step information different from the second step information from the task information, and identifying whether the task is performed normally.

The operation of identifying whether the task is performed normally may, based on the task not being performed normally in a state wherein only the second step information has been excluded from the task information, include: excluding the second step information and step information related to the second step information from the task information, and identifying whether the task is performed normally, The other step information related to the second step information is step information including a motion of the same type as the type of the motion corresponding to the second step information.

The method may further include: identifying a fourth weight based on the type of the motion corresponding to the first step information, and applying the first weight and the fourth weight to the first step information.

The operation of updating the task information may include: maintaining preset essential step information among the plurality of step information in the task information and update the task information.

A non-transitory computer-readable recording medium storing a computer instruction which, based on being executed by a processor of an electronic apparatus, makes the electronic apparatus perform an operation, wherein the operation include: applying a first weight to first step information including the keyword information among a plurality of step information included in the task information, applying a second weight different from the first weight to second step information including a motion among the plurality of step information, updating the task information based on the first step information to which the first weight was applied and the second step information to which the second weight was applied and based on a voice command for the application being input, executing the voice recognition agent function based on the updated task information.

According to the various example embodiments of the disclosure, an electronic apparatus can perform a function of an application without going through some unnecessary steps included in a task, and can thus perform the function of the application within a short time. Accordingly, a user's convenience is improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
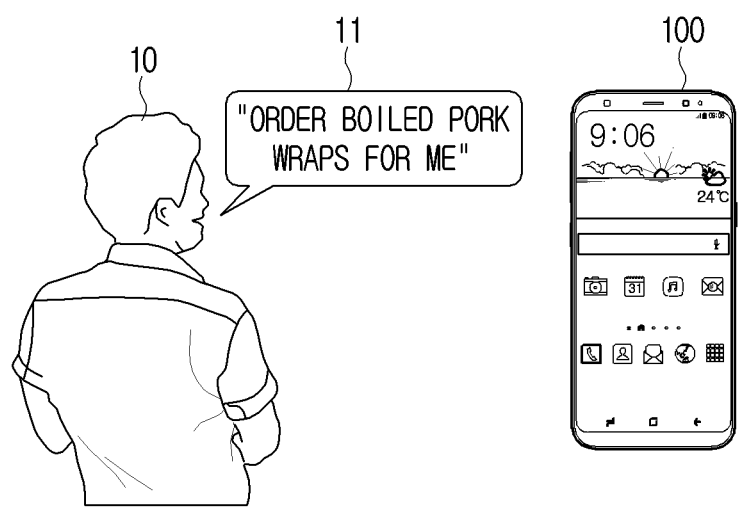
FIG. 1 is a diagram illustrating an example voice recognition agent function for promoting understanding of the disclosure.

Hereinafter, the disclosure will be described in greater detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be terms that were arbitrarily selected, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In the disclosure, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to refer to any one of "A" or "B" or "A and B."

Further, the expressions "first," "second" and the like used in the disclosure may be used to describe various elements regardless of any order and/or degree of importance. Such expressions are used to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Singular expressions include plural expressions, as long as they conflict with the context. Further, in the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

In the disclosure, the term 'a user' may refer to a person who uses an electronic apparatus. Hereinafter, various example embodiments of the disclosure will be described in greater detail with reference to the accompanying drawings.

FIG. 1 is a diagram illustrating an example voice recognition agent function for promoting understanding of the disclosure.

According to FIG. 1, a user 10 may execute a specific application through an electronic apparatus 100, e.g., a smartphone 100. The specific application may be an application that performs a function of ordering delivery food.

The user 10 may execute a function (hereinafter, referred to as a task) of an application by manipulating buttons or a touch screen provided on the electronic apparatus 100, but the user 10 may also execute a task through a voice recognition agent function provided by the electronic apparatus 100. The electronic apparatus 100 may provide an artificial intelligence (AI) voice recognition agent function, and the voice recognition agent function according to an embodiment may refer, for example, to entire services wherein the electronic apparatus 100 provides response information to a user based on a voice command when a voice command of the user is input.

According to an embodiment, the user 10 may activate the voice recognition agent function by inputting an utterance including a wake-up word activating the voice recognition agent function provided by the electronic apparatus 100 into the electronic apparatus 100, and execute a task by additionally inputting an utterance 11 corresponding to a specific task.

For example, if the user 10 inputs an utterance 11 corresponding to a text "Order boiled pork wraps for me" into the electronic apparatus 100, the electronic apparatus 100 may drive an application performing a function of ordering delivery food, and provide a user interface (UI) for ordering food corresponding to "boiled pork wraps" to the user 10.

The electronic apparatus 100 may use a specific algorithm to execute a task based on the user's utterance 11. For example, the electronic apparatus 100 that recognized the user's utterance 11 may use an algorithm of providing a UI to the user 10 through an A step, a B step, and a C step.

In the disclosure, an algorithm that the electronic apparatus 100 uses to execute a task and provide a UI to the user 10 will be described as the term 'task information.' Information regarding a plurality of steps included in the task information may be referred to as the term 'step information.'

Due to updating of an application, etc., the task information that the electronic apparatus 100 uses to execute a task may also be changed. According to an embodiment, the electronic apparatus 100 may receive changed task information from an external server and use the information, but according to an embodiment, the electronic apparatus 100 may use task information updated based on information input from the user 10. Updating may refer, for example, to an operation of correcting all or some of task information that the electronic apparatus 100 previously stored and newly storing the information.

For example, the user 10 may input information regarding an utterance corresponding to a task and a plurality of step information including a user motion necessary for executing the task into the electronic apparatus 100, and the electronic apparatus 100 may update the task information based on the input information, and execute the task based on the updated task information.

In the plurality of step information input by the user 10, information on a step that is not essential for executing the task (hereinafter, referred to as an unnecessary step) may be included. Accordingly, the electronic apparatus 100 may update the task information based on the remaining step information excluding the step information regarding the unnecessary step.

Various embodiments wherein the electronic apparatus 100 can execute a task more effectively by updating the task information based on the remaining step information excluding information regarding an unnecessary step among the plurality of step information input from the user 10 will be described in greater detail below.

In the disclosure, the expression that an application or a task is 'performed' has the same or similar meaning as the expression that an application or a task is 'executed,' and thus 'execution' and 'performing' may be used interchangeably.

Figure 2:
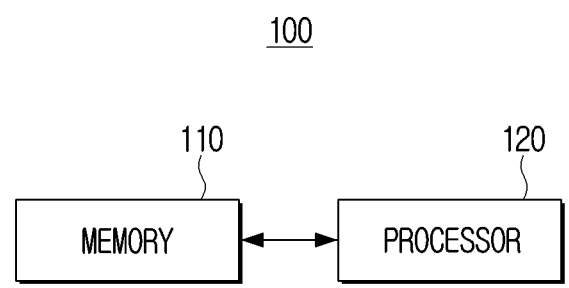
FIG. 2 is a block diagram illustrating an example configuration of an electronic apparatus according to various embodiments.

FIG. 2 is a block diagram illustrating an example configuration of an electronic apparatus according to various embodiments.

According to FIG. 2, the electronic apparatus 100 may include a memory 110 and a processor (e.g., including processing circuitry) 120.

The memory 110 may store data necessary for the various embodiments of the disclosure. The memory 110 may be implemented in a form of a memory embedded in the electronic apparatus 100, or in a form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100. In the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.), a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), an external memory that can be connected to a USB port (e.g., a USB memory), etc.

The memory 110 according to an embodiment of the disclosure may store task information and keyword information regarding a voice recognition agent function related to execution of an application stored in the electronic apparatus 100. The keyword information may include information included in information regarding an utterance corresponding to a task. The memory 110 can store information regarding at least one application and entire information regarding the voice recognition agent function.

The processor 120 may include various processing circuitry and controls the overall operations of the electronic apparatus 100. Specifically, the processor 120 may be connected with each component of the electronic apparatus 100, and control the overall operations of the electronic apparatus 100. For example, the processor 120 may be connected with the memory 110, and control the operations of the electronic apparatus 100.

According to an embodiment, the processor 120 may be referred to by various names such as a digital signal processor (DSP), a microprocessor, a central processing unit (CPU), a dedicated processor, a micro controller unit (MCU), a micro processing unit (MPU), a neural processing unit (NPU), a controller, an application processor (AP), etc., but in this disclosure, it will be described as the processor 120.

The processor 120 may be implemented as a System on Chip (SoC) or large scale integration (LSI), or in the form of a field programmable gate array (FPGA). Also, the processor 130 may include a volatile memory such as an SRAM, etc.

The processor 120 according to an embodiment may apply a first weight to first step information including keyword information among the plurality of step information included in the task information stored in the memory 110. Applying a weight may refer, for example, to including information on a weight in the step information and storing the information. According to an embodiment, a weight applied to a specific step may have a numerical value corresponding to how important the role that the step information plays in executing a task according to the task information is.

For example, regarding an application that performs a function of ordering delivery food, the keyword information according to an embodiment may include a text corresponding to a name of food. The processor 120 may include information on the first weight in the first step information including the text corresponding to the name of food and store the information.

The processor 120 may apply a second weight different from the first weight to second step information including a user motion of a first type among the plurality of step information. A user motion according to an embodiment may include at least one of a scroll motion, a button click motion, an image click motion, a typing motion, or an application execution motion.

For example, if a step is 'moving to the next step by clicking a button,' a user motion corresponding to the step may be 'a button click motion.'

The processor 120 may apply a third weight different from the second weight to third step information including a user motion of a second type different from the first type. For example, in case a step is 'typing a name of food in the search window,' a user motion corresponding to the step may be 'a typing motion.' In this case, the processor 120 may apply the third weight different from the second weight applied to the step information including 'a button click motion' to the step information including 'a typing motion.'

Accordingly, the processor 120 may respectively apply weights different from the first weight to individual steps including user motions in various types.

Through this, the processor 120 may update the task information based on the first step information to which the first weight was applied and the second step information to which the second weight was applied. That is, the processor 120 may acquire task information wherein the previous step information was replaced by step information including information on weights, and store the information.

If a user voice command for an application is input after the task information is updated, the electronic apparatus 100 may execute the voice recognition agent function based on the updated task information, and ultimately execute the task corresponding to the user voice command.

If the second weight applied to the second step information is less than a threshold numerical value, the processor 120 may exclude the second step information from the task information, and if the second weight is greater than or equal to the threshold numerical value, the processor 120 may maintain the second step information in the task information. Here, excluding step information from the task information may refer, for example, to deleting the step information from the task information, and storing the information.

In case the task is not performed normally based on the task information wherein the second step information was excluded, the processor 120 may maintain the second step information and exclude step information different from the second step information from the task information, and identify whether the task is performed normally. The step information different from the second step information may be step information including a user motion of a different type from the type of the user motion corresponding to the second step information.

According to an embodiment, in case the task is not performed normally in a state wherein the second step information has been excluded from the task information, the processor 120 may maintain the second step information and preferentially exclude step information to which a relatively low weight was applied among the plurality of step information different from the second step information from the task information, and identify whether the task is performed normally.

In case the task is not performed normally in a state wherein only the second step information has been excluded from the task information, the processor 120 may exclude the second step information and step information related to the second step information from the task information, and identify whether the task is performed normally. The other step information related to the second step information may be step information including a user motion of the same type as the type of the user motion corresponding to the second step information.

The processor 120 may identify a fourth weight based on the type of the user motion corresponding to the first step information. As described above, the first step information may be step information including keyword information, and in this regard, the first weight may be applied. The processor 120 may identify the fourth weight based on a type of a user motion included in the step independently from the first weight regarding the keyword information included in the step information, and update the task information based on the first step information to which both of the first weight and the fourth weight were applied.

The processor 120 may maintain preset essential step information among the plurality of step information in the task information and update the task information. For example, in a process of excluding information regarding an unnecessary step included in the task information, the processor 120 may not exclude the preset essential step information, but maintain the information. Here, the essential step information may be information that the manufacturer of the electronic apparatus 100 set in the manufacturing step, or information that a user arbitrarily set.

Figure 3:
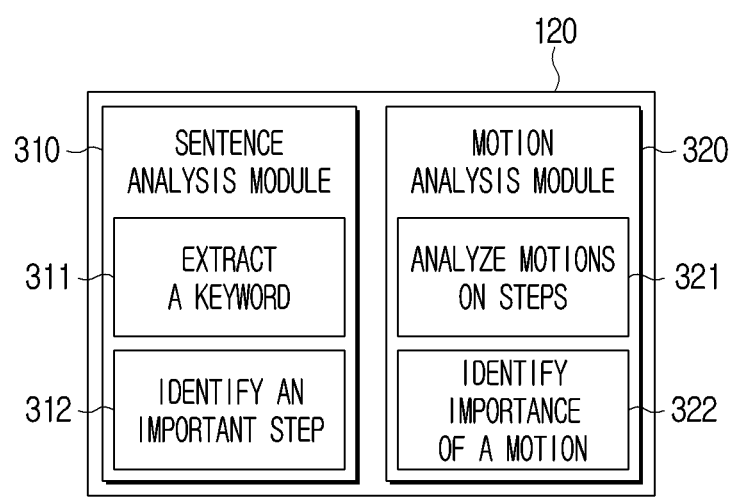
FIG. 3 is a block diagram illustrating an example configuration of a processor according to various embodiments.

FIG. 3 is a block diagram illustrating an example configuration of a processor according to various embodiments.

Referring to FIG. 3, the processor 120 may include a sentence analysis module (e.g., including processing circuitry and/or executable program instructions) 310 and a motion analysis module (e.g., including processing circuitry and/or executable program instructions) 320. Each of these modules may be a module that uses software stored in the memory 110 of the electronic apparatus 100 or a hardware module implemented in a circuit form on the electronic apparatus 100. Each of these modules may be implemented in a form wherein software and hardware are combined.

Hereinafter, explanation will be made based on the premise that each module described above performs an operation corresponding to a function of the processor 120.

The electronic apparatus 100 according to an embodiment of the disclosure may extract a keyword from information regarding an utterance corresponding to a task through the sentence analysis module 310. The information regarding an utterance corresponding to a task may be text information including a specific keyword.

For example, a user may store information regarding an utterance corresponding to a task in the electronic apparatus 100, and in this case, the electronic apparatus 100 may identify (e.g., extract) (311) a keyword in the information regarding an utterance corresponding to a task stored in the electronic apparatus 100 through the sentence analysis module 310.

For example, the user may store text information which is "Order boiled pork wraps for me" in the electronic apparatus 100 as utterance information corresponding to a task related to ordering of delivery food. In this case, the electronic apparatus 100 may extract a keyword "boiled pork wraps" corresponding to the name of the food through the sentence analysis module 310.

In the process of extracting a keyword, the electronic apparatus 100 may divide the text "Order boiled pork wraps for me" included in the utterance information by a predetermined unit. The predetermined unit may be a morpheme. Further, the electronic apparatus 100 may identify a word corresponding to a specific word class in the text divided by the predetermined unit.

According to an embodiment, the electronic apparatus 100 may identify a text corresponding to the word class of 'a noun.' Ultimately, from the text "Order boiled pork wraps for me," two keywords which are 'boiled pork wraps' and 'order' may, for example, be extracted. The electronic apparatus 100 may tag word classes corresponding to the extracted keywords. Tagging may refer, for example, to including a tag corresponding to a word class of a keyword in the text information, and store the information.

The electronic apparatus 100 may apply a weight corresponding to keyword information regarding information on a step (hereinafter, referred to as step information) including information on the identified keyword (hereinafter, referred to as keyword information) among the plurality of step information included in the task information through the sentence analysis module 310, and identify (312) the step as an important step.

The electronic apparatus 100 may identify (e.g., by analyzing) (321) user motions of various types included in the plurality of respective step information necessary for executing a task through the motion analysis module 320. For example, the electronic apparatus 100 may respectively identify 'a button click motion' as a user motion included in step information corresponding to 'moving to the next step by clicking a button,' and identify 'a typing motion' as a user motion included in step information corresponding to 'typing a name of food in the search window.'

The electronic apparatus 100 may apply (322) weights corresponding to user motions regarding the plurality of step information based on the identified types and importance of the user motions.

Figure 4:
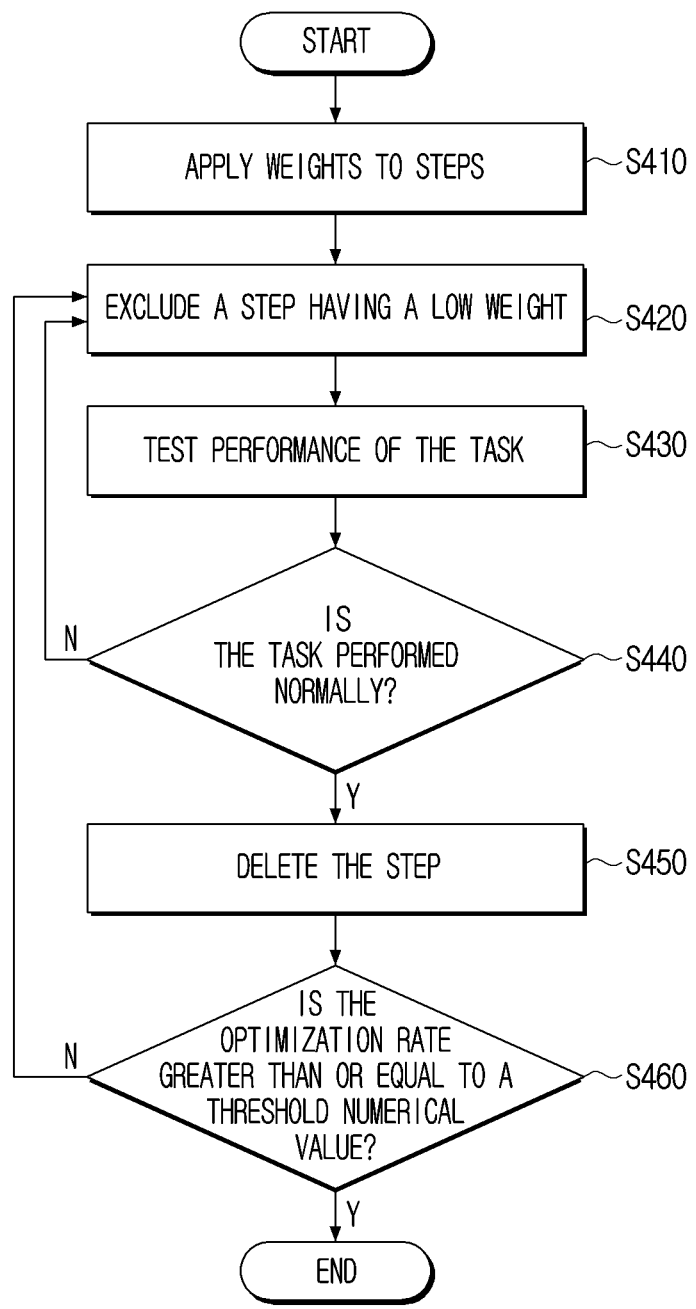
FIG. 4 is a flowchart illustrating an example optimizing operation of an electronic apparatus according to various embodiments.

FIG. 4 is a flowchart illustrating an example optimizing operation of an electronic apparatus according to various embodiments.

The electronic apparatus 100 according to an embodiment of the disclosure may apply different weights to individual steps based on keyword information and user motions included in the plurality of step information included in the task information in operation S410.

The electronic apparatus 100 may preferentially exclude step information to which a relatively low weight was applied among the plurality of step information to which weights were applied from the task information in operation S420. For example, step information to which a lower weight was applied may refer, for example, to step information which is relatively less important in executing a task based on the task information. Thus, even in case the step information is excluded from the task information, the task can be executed normally.

The electronic apparatus 100 may identify whether the task is performed normally based on the task information wherein the step having a low weight was excluded by testing performance of the task in operation S430. For example, in case the task is performed normally based on the task information wherein the step information to which a relatively low weight was applied was excluded in operation S440:Y, the electronic apparatus 100 may update the task information by deleting the step from the task information and storing the information in operation S450.

In case the task is not performed normally based on the task information wherein the step information to which a relatively low weight was applied was excluded in operation S440:N, the electronic apparatus 100 may maintain the step in the task information and exclude the step to which the second lowest weight was applied from the task information in operation S420, and identify again whether the task is executed normally in operation S430.

An operation of deleting step information unnecessary for executing the task (S450) may not be repeated infinitely. If the optimization rate is identified to be greater than or equal to a threshold numerical value in operation S460:Y, the electronic apparatus 100 according to an embodiment may not delete unnecessary step information any longer, but store the task information wherein only the step information previously deleted was excluded in the memory 110.

The optimization rate may refer, for example, to a rate that the time taken for the electronic apparatus 100 to execute the task based on the task information after an optimizing operation was reduced compared to before the optimization. In this case, keeping proceeding with optimization even though the task information was optimized to a specific level or more may not be effective. According to an embodiment, if the time taken for executing the task based on the task information by optimization was reduced by 30% or more compared to before the optimization, the electronic apparatus 100 may stop the optimizing operation.

In case the optimization rate is lower than the threshold numerical value in operation S460:N, the electronic apparatus 100 may repeat the previous operation for additionally deleting the step information to which a relatively low weight was applied in operations S420 and S430.

Figure 5:
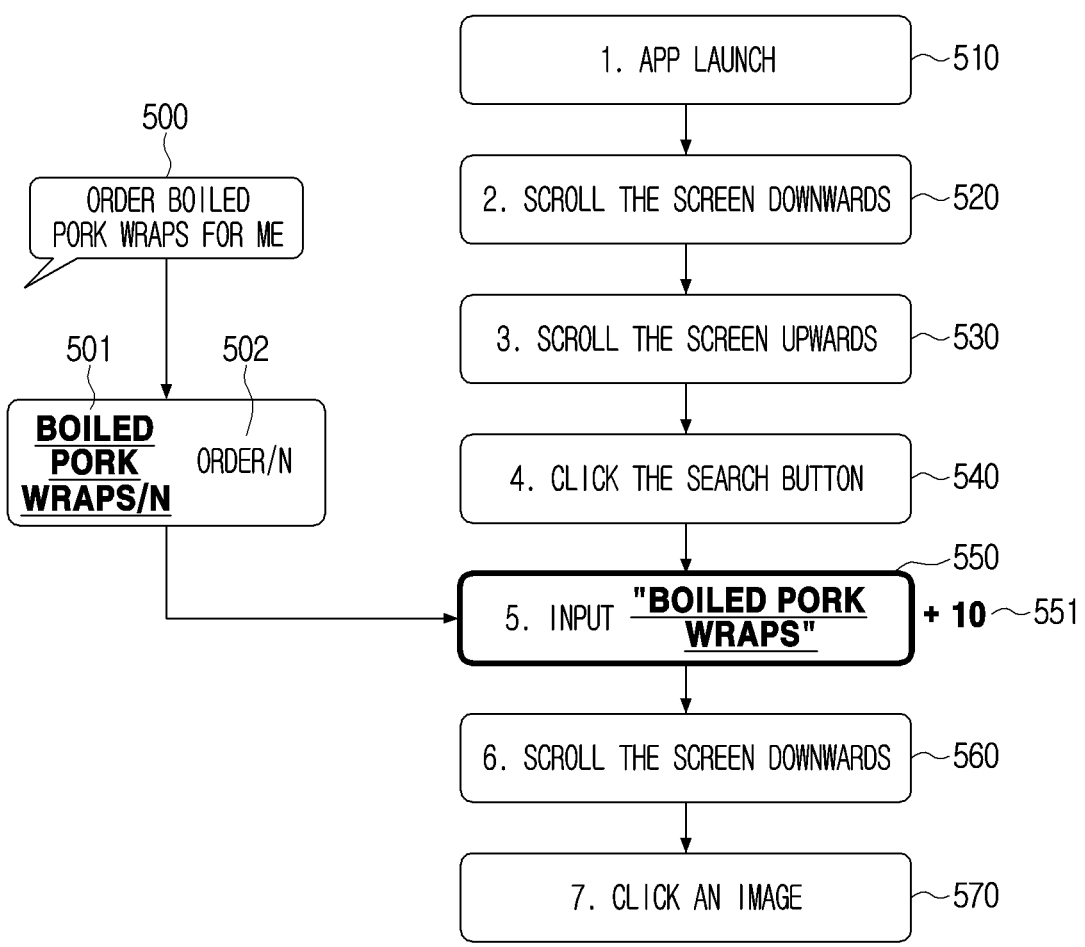
FIG. 5 is a diagram illustrating an example operation wherein an electronic apparatus applies a weight to step information including keyword information according to various embodiments.

FIG. 5 is a diagram illustrating an example operation wherein an electronic apparatus applies a weight to step information including keyword information according to various embodiments.

The electronic apparatus 100 according to an embodiment of the disclosure may identify text information which is "Order boiled pork wraps for me" in utterance information 500 corresponding to a task related to ordering of delivery food. Also, the electronic apparatus 100 may extract two keywords which are 'boiled pork wraps' and 'order' from the identified text information. In addition, the electronic apparatus 100 may tag word classes corresponding to the extracted keywords. As a result, tagging 501 corresponding to a word class which is 'a noun (N)' may be added to the keyword which is 'boiled pork wraps,' and tagging 502 corresponding to a word class which is 'a noun (N)' may be added to the keyword which is 'order,' respectively, and stored.

The respective 510, 520, 530, 540, 550, 560 and 570 (which may be referred to herein as steps 510-570) illustrated in FIG. 5 may fall under the plurality of steps corresponding to the task which is ordering of delivery food. For example, the task which is ordering of delivery food may be executed by going through the steps of executing an application 510, scrolling the screen downwards 520, scrolling the screen upwards 530, clicking the search button 540, inputting 'boiled pork wraps' in the search window 550, scrolling the screen downwards 560, and clicking a food image 570. The electronic apparatus 100 according to an embodiment may apply a weight to step information including the keyword extracted from the utterance information 500 for identifying a step which plays an important role in executing the task among the plurality of steps.

For example, in the step 550 of inputting 'boiled pork wraps' in the search window, information corresponding to the text 'boiled pork wraps' may be stored in the electronic apparatus 100 as step information regarding the step. In this case, the electronic apparatus 100 may apply a weight 551 to step information 550 including 'boiled pork wraps' among the keywords identified in the plurality of steps, and identify the step 550 as an important step.

Figure 6:
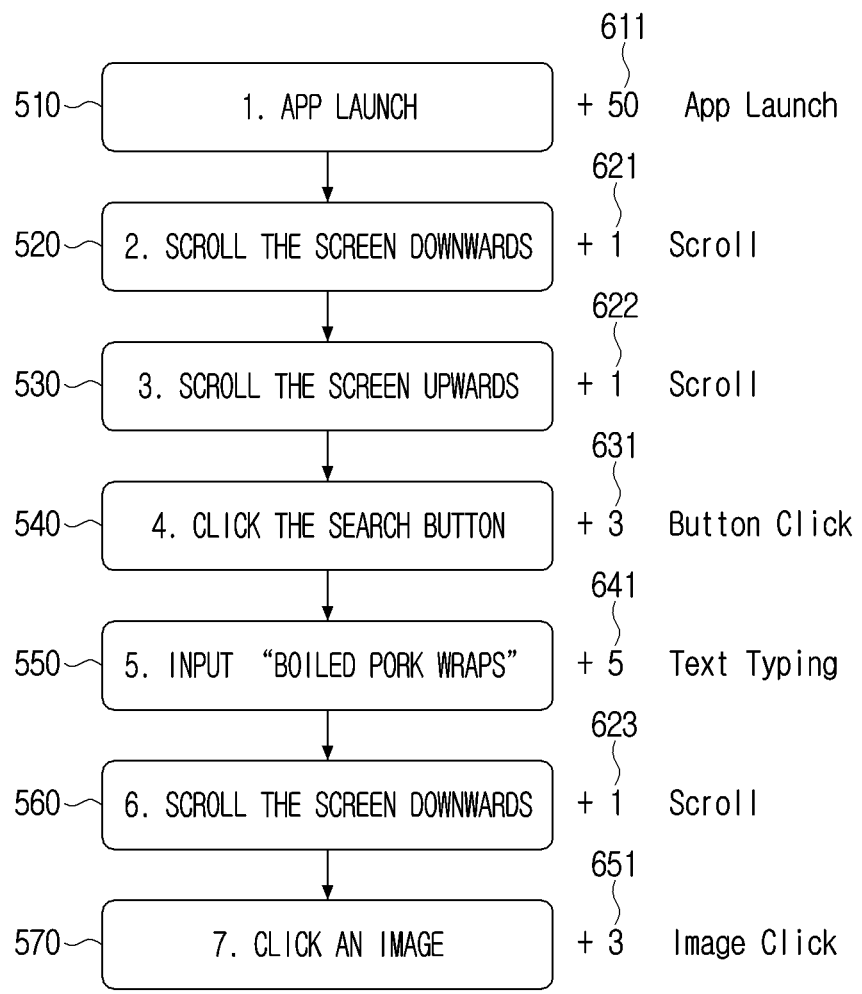
FIG. 6 is a diagram illustrating an example operation wherein an electronic apparatus applies a weight to step information including a motion according to various embodiments.

FIG. 6 is a diagram illustrating an example operation wherein an electronic apparatus applies a weight to step information including a motion according to various embodiments.

Referring to FIG. 6, a user motion 600 necessary for executing a task may have types corresponding to an application execution motion 610, a scroll motion 620, a button click motion 630, a typing motion 640, and an image click motion 650. In FIG. 6, only user motions of five types were illustrated, but the disclosure is not limited thereto.

According to an embodiment, a step including a motion 610 among user motions of various types may be an essential step for executing a task. Specifically, for executing a task corresponding to a function of an application, a step including 'the application execution motion 610' should necessarily be gone through, and thus the electronic apparatus 100 may maintain the essential step information including the motion 610 in the task information. In this case, the essential step information may be information that the manufacturer or a user of the electronic apparatus 100 set in advance.

The electronic apparatus 100 may not separately apply a weight for the essential step information, but the electronic apparatus 100 may add a weight greater than or equal to a threshold numerical value for the essential step information, and may thereby make the essential step information not excluded from the task information. Specifically, regarding 'the step of executing an application 510' including 'the application execution motion 610,' the electronic apparatus 100 may apply a weight 611 of 50.

Regarding the remaining step information excluding the essential step information, the electronic apparatus 100 may respectively apply weights corresponding to individual user motion types. For example, regarding 'the step of scrolling the screen downwards 520' including 'the scroll motion 620,' the electronic apparatus 100 may apply a weight 621 of 1 corresponding to 'the scroll motion 620,' and regarding 'the step of clicking the search button 540' including 'the button click motion 630,' the electronic apparatus 100 may apply a weight 631 of 3 corresponding to 'the button click motion 630,' regarding the 'the step of inputting "boiled pork wraps" 550' including 'the text typing motion 640,' the electronic apparatus 100 may apply a weight 641 of 5 corresponding to 'the text typing motion 640,' regarding 'the step of scrolling the screen downwards 560' including 'the scroll motion 620,' the electronic apparatus 100 may apply a weight 623 of 1 corresponding to 'the scroll motion 620,' and regarding 'the step of clicking an image 570' including 'the image click motion 650,' the electronic apparatus 100 may apply a weight 651 of 3 corresponding to 'the image click motion 650.'

Figure 7:
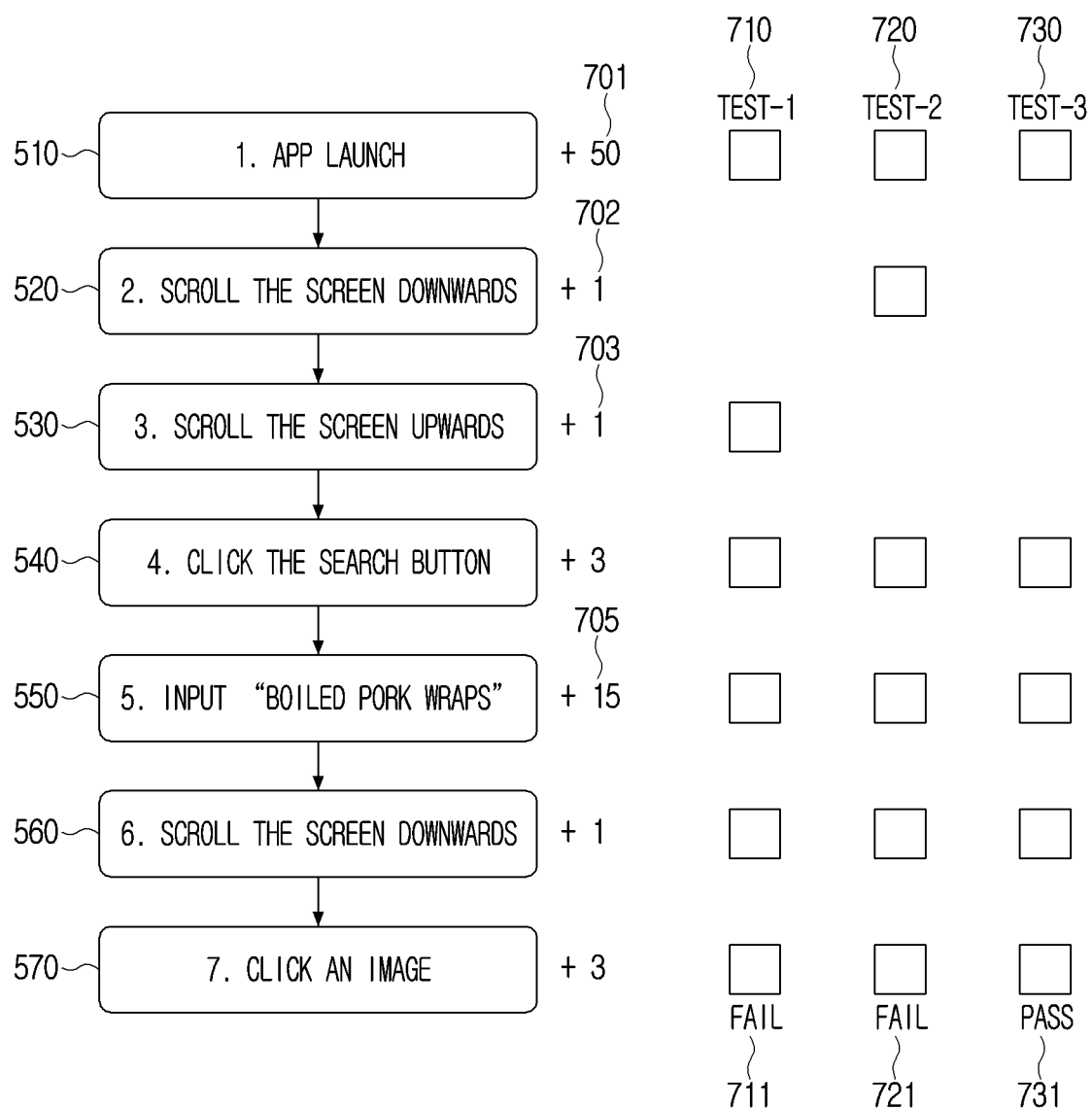
FIG. 7 is a diagram illustrating an example operation wherein an electronic apparatus excludes unnecessary step information according to various embodiments.

FIG. 7 is a diagram illustrating an example operation wherein an electronic apparatus excludes unnecessary step information according to various embodiments.

Referring to FIG. 7, 'the step of executing an application 510' may be an essential step. Accordingly, to the step 510, a weight 701 of 50 may be applied. Also, to 'the step of inputting "boiled pork wraps" in the search window 550,' a weight 705 of 15 wherein 10 which is a weight corresponding to the step 550 including the keyword (boiled pork wraps) and 5 which is a weight corresponding to 'the typing motion' were summed up may be applied.

The electronic apparatus 100 according to an embodiment may preferentially exclude step information 520 to which a relatively low weight 702 was applied among the plurality of step information to which weights corresponding to keyword information and weights corresponding to user motions were applied from the task information. The electronic apparatus 100 may preferentially exclude step information to which a weight less than a threshold numerical value (e.g.: 2) was applied from the task information.

The electronic apparatus 100 may identify (710) whether the task is performed normally based on the task information wherein some steps 520 were excluded. As a result of identification, the task may not be performed normally (711). Likewise, the task may not be performed normally (721) based on the task information wherein step information 530 to which a relatively low weight 703 was applied was excluded.

The electronic apparatus 100 may simultaneously exclude two step information 520, 530 having the same user motion type (a scroll motion) from the task information, and identify (730) whether the task is performed normally. In case the step 520 of scrolling the screen downwards and the step 530 of scrolling the screen upwards are simultaneously omitted, the task may be performed normally 731. Accordingly, the electronic apparatus 100 may store the task information wherein the two step information 520, 530 were simultaneously excluded.

As a result, the electronic apparatus 100 may simultaneously remove the two step information 520, 530 respectively corresponding to operations opposing each other in a reversible operation (an operation of scrolling the screen upwards or an operation of scrolling the screen downwards) from the task information, and acquire task information for executing a task more effectively.

Although not illustrated in FIG. 7, the electronic apparatus 100 may identify whether the task is performed normally by excluding step information including a user motion of a different type from the user motions corresponding to the step information 520, 530 wherein the task was not performed normally when the step information was excluded from the task information.

Figure 8:
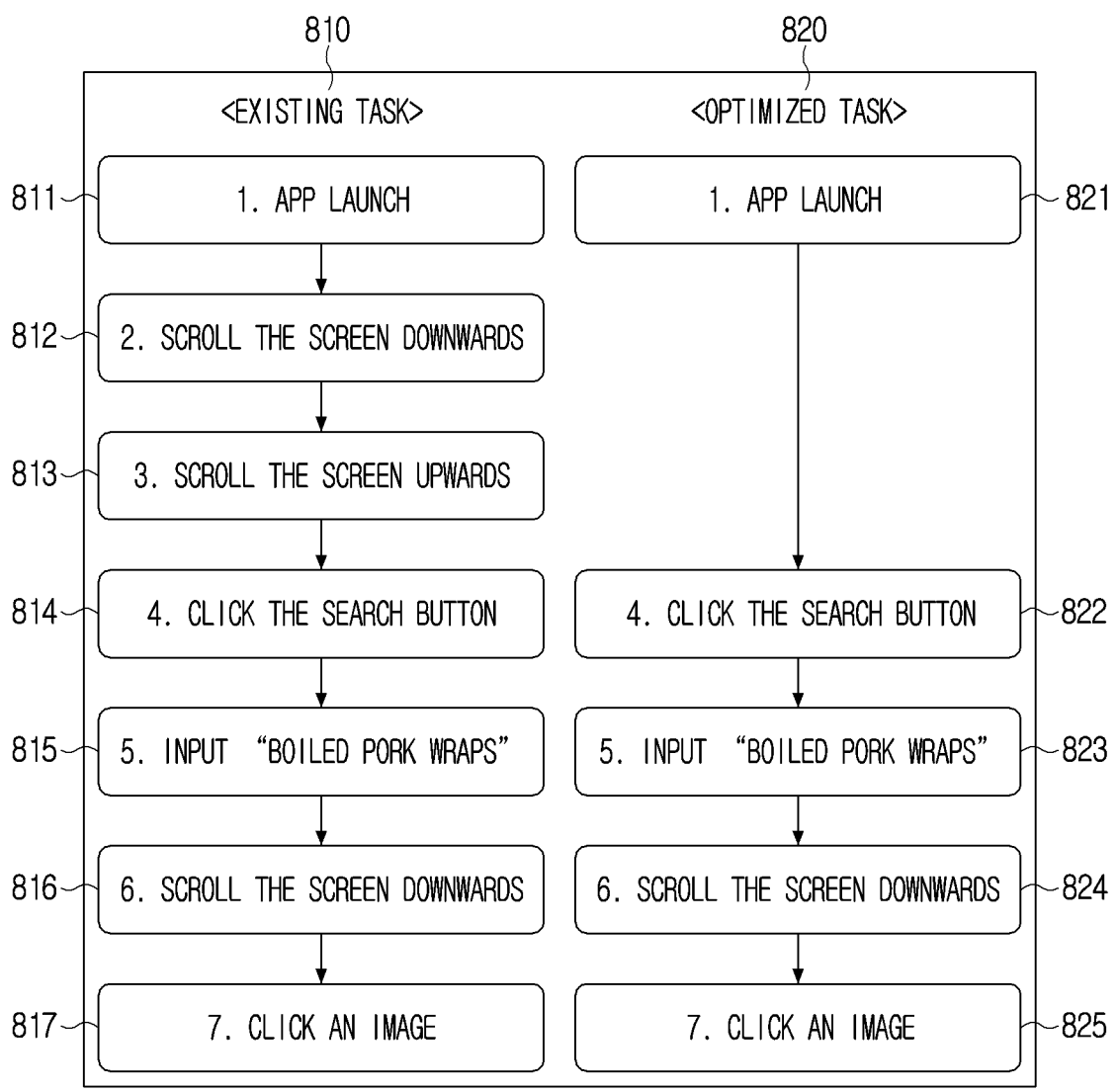
FIG. 8 is a diagram illustrating a result of a task optimizing operation of an electronic apparatus according to various embodiments.

FIG. 8 is a diagram illustrating an example result of a task optimizing operation of an electronic apparatus according to various embodiments.

Referring to FIG. 8, the existing task information 810 may include a plurality of step information corresponding to 'a step of executing an application 811,' 'a step of scrolling the screen downwards 812,' 'a step of scrolling the screen upwards 813,' 'a step of clicking the search button 814,' 'a step of inputting "boiled pork wraps" in the search window 815,' 'a step of scrolling the screen downwards 816,' and 'a step of clicking a food image 817.'

The task information 820 optimized according to an optimizing operation of the electronic apparatus 100 may include a plurality of step information corresponding to 'a step of executing an application 821,' 'a step of clicking the search button 822,' 'a step of inputting "boiled pork wraps" in the search window 823,' 'a step of scrolling the screen downwards 824,' and 'a step of clicking a food image 825.' In this case, the optimized task information 820 includes only step information in a smaller number than the existing task information 810. Accordingly, in case the electronic apparatus 100 performs the task based on the optimized task information 820, less time than the time that is taken in the case of performing the task based on the existing task information 810 may be taken.

According to an embodiment, by virtue of the optimizing operation of the electronic apparatus 100, the time taken for executing a task can be reduced, and thus a user's convenience can be improved. In addition to this, there is no need to go through unnecessary steps, and thus the operation amount and the consumed power of the processor 120 can also be reduced.

The electronic apparatus 100 may perform the task by going through only 'the step of clicking a food image 825' without going through 'the step of scrolling the screen downwards 824' after 'the step of inputting "boiled pork wraps" in the search window 823.' However, in case the optimization rate according to excluding two step information 812, 813 from the task information 810 is identified to be greater than or equal to the threshold numerical value, the electronic apparatus 100 may stop the optimization operation, and store the task information 820 wherein only the two step information 812, 813 was excluded from the existing task information 810.

Figure 9:
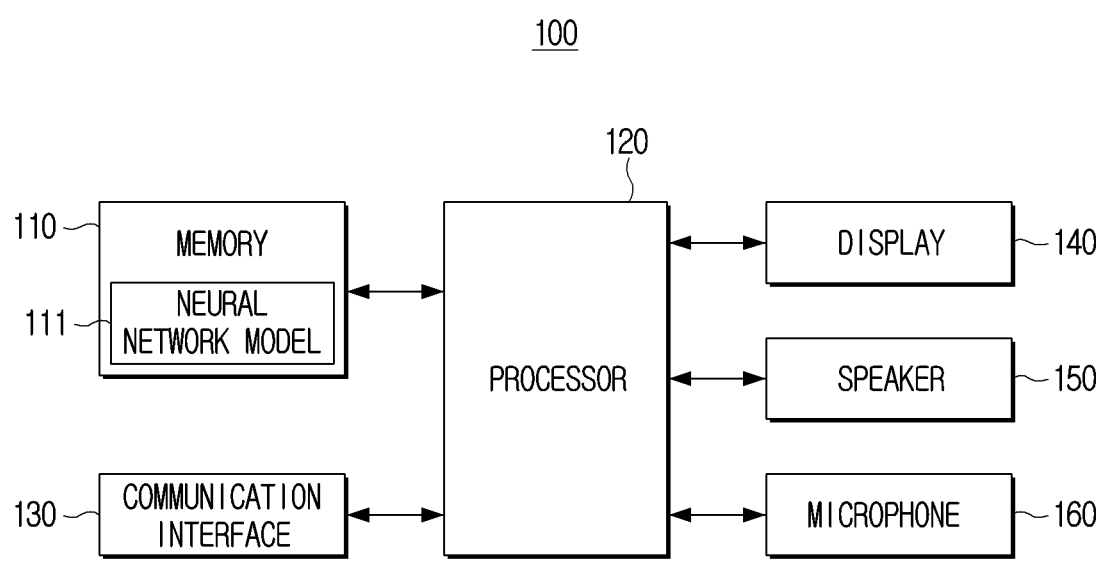
FIG. 9 is a block diagram illustrating an example configuration of an electronic apparatus according to various embodiments.

FIG. 9 is a block diagram illustrating an example configuration of an electronic apparatus according to various embodiments.

According to FIG. 9, the electronic apparatus 100 may include a memory 110, a processor (e.g., including processing circuitry) 120, a communication interface (e.g., including communication circuitry) 130, a display 140, a speaker 150, and a microphone 160. Among the components illustrated in FIG. 9, regarding the components overlapping with the components illustrated in FIG. 2, detailed explanation will be omitted.

The memory 110 according to an embodiment may store a neural network model (e.g., including executable program instructions) 111. The neural network model 111 may include a plurality of neural network layers. Each of the plurality of neural network layers has a plurality of weight values, and performs a neural network operation through an operation between the operation result of the previous layer and the plurality of weight values. The plurality of weight values that the plurality of neural network layers have may be optimized by a learning result of the neural network model. For example, the plurality of weight values may be updated such that a loss value or a cost value acquired from a neural network model during a learning process is reduced or minimized. An artificial neural network may include a deep neural network (DNN), and there are, for example, and without limitation, a convolutional neural network (CNN), a deep neural network (DNN), a recurrent neural network (RNN), a restricted Boltzmann Machine (RBM), a deep belief network (DBN), a bidirectional recurrent deep neural network (BRDNN), or deep Q-networks, etc., but the disclosure is not limited to the aforementioned examples.

The processor 120 according to an embodiment may control the electronic apparatus to input utterance information corresponding to a task into the neural network model 111, and extract specific keyword information. In this case, the neural network model 111 may be a model trained to receive input of text information in a sentence form and output a word corresponding to a specific word class.

The communication interface 130 may include various communication circuitry and input and output various types of data. For example, the communication interface 130 may transmit and receive various types of data with an external apparatus (e.g., a source apparatus), an external storage medium (e.g., a USB memory), and an external server (e.g., a web hard) through communication methods such as Wi-Fi based on AP (Wi-Fi, a wireless LAN network), Bluetooth, Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), optical, coaxial, etc.

In FIG. 9, it is described that the memory 110 stores the neural network model 111, but the disclosure is not limited thereto, and the electronic apparatus 100 may receive the neural network model 111 through the communication interface 130 and utilize it.

The display 140 may be implemented as various forms of displays such as, for example, and without limitation, a liquid crystal display (LCD), an organic light emitting diodes (OLED) display, a quantum dot light-emitting diodes (QLED) display, a plasma display panel (PDP), etc. In the display 140, a driving circuit that may be implemented in forms such as a TFT, a low temperature poly silicon (LTPS) TFT, an organic TFT (OTFT), etc., and a backlight unit, etc. may also be included together. Meanwhile, the display 140 may be implemented as a flexible display, a three-dimensional (3D) display, etc.

The processor 120 according to an embodiment may provide entire visual UIs related to the voice recognition agent service or a visual UI corresponding to a performed task to a user through the display 140. Also, in case the display 140 is implemented as a touch screen, a user may input information regarding user motions corresponding to various types into the electronic apparatus 100 through the display 140.

The speaker 150 is a device that converts an electronic audio signal of the electronic apparatus 100 into a sound wave. The speaker 150 may include a permanent magnet, a coil, and a vibration plate, and may output audio by vibrating the vibration plate by an electromagnetic interaction that occurs between the permanent magnet and the coil.

The processor 120 according to an embodiment may control the speaker 150 to output a feedback voice corresponding to a user voice command, and an audio UI related to a performed task.

The microphone 160 generally refers to a device that receives input of a sound wave and generates a current of the same waveform as this, and it is a component receiving a sound signal corresponding to a user's voice command. The processor 120 according to an embodiment may convert a sound signal included in an input sound into a digital signal based on a current of a waveform generated by the microphone 160.

According to an embodiment, the electronic apparatus 100 may receive input of information regarding an utterance corresponding to a task from a user through the microphone 160.

Figure 10:
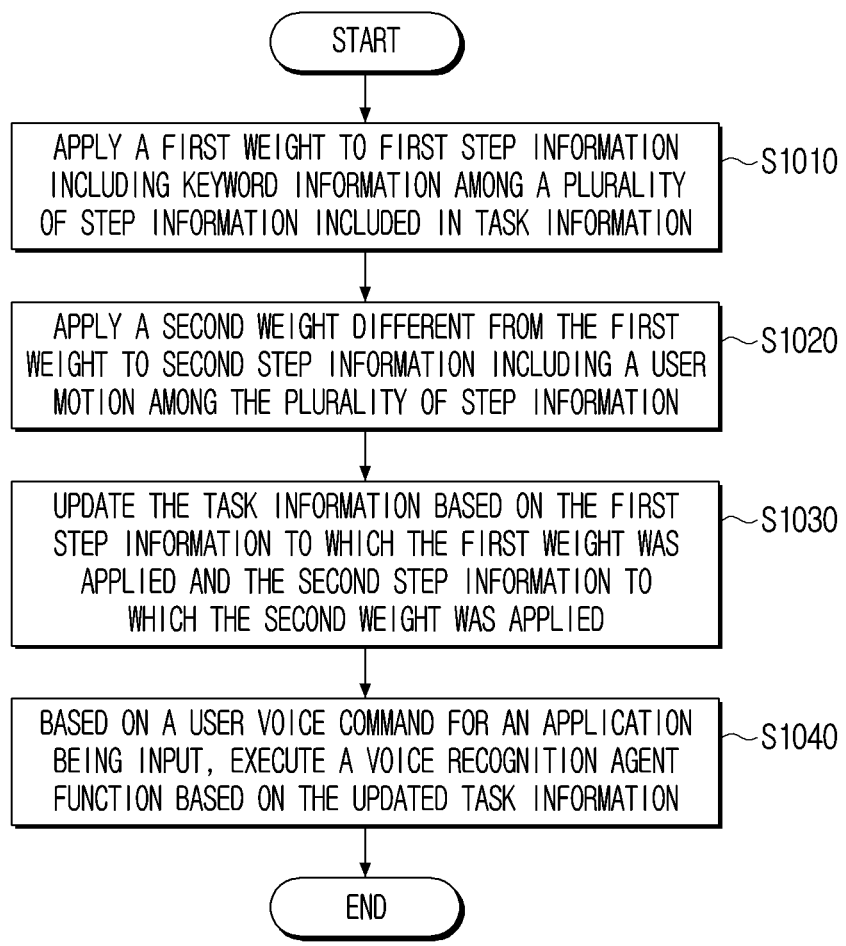
FIG. 10 is a flowchart illustrating an example method of controlling an electronic apparatus according to various embodiments.

FIG. 10 is a flowchart illustrating an example method of controlling the electronic apparatus according to various embodiments.

According to a controlling method of an electronic apparatus according to an embodiment of the disclosure, a first weight is applied to first step information including keyword information among a plurality of step information included in task information in operation S1010.

A second weight different from the first weight is applied to second step information including a user motion among the plurality of step information in operation S1020.

The task information is updated based on first step information to which the first weight was applied through the operation S1010 and second step information to which the second weight was applied through the operation S1020 in operation S1030.

If a user voice for an application is input, a voice recognition agent function may be executed based on the task information updated through the operation S1030 in operation S1040.

In the operation S1020 of applying the second weight, the second weight may be applied to the second step information including a user motion of a first type among the plurality of step information, and a third weight different from the second weight may be applied to third step information including a user motion of a second type different from the first type among the plurality of step information.

In the operation S1020 of applying the second weight, based on the second weight applied to the second step information being less than a threshold numerical value, the second step information may be excluded from the task information, and based on the second weight applied to the second step information being greater than or equal to the threshold numerical value, the second step information may be maintained in the task information.

In the operation S1030 of updating the task information, after excluding the second step information from the task information, it may be identified whether a task is performed normally, and based on the task being performed normally, the second step information may be excluded from the task information.

In the operation S1030 of updating the task information, based on the task not being performed normally in a state wherein the second step information has been excluded from the task information, the second step information may be maintained and step information different from the second step information may be excluded from the task information, and it may be identified whether the task is performed normally. The step information different from the second step information may be step information including a user motion of a different type from the type of the user motion corresponding to the second step information.

In the operation S1030 of updating the task information, based on the task not being performed normally in a state wherein the second step information has been excluded from the task information, the second step information may be maintained and step information to which a relatively low weight was applied among the plurality of step information different from the second step information may be preferentially excluded from the task information, and it may be identified whether the task is performed normally.

In the operation S1030 of updating the task information, based on the task not being performed normally in a state wherein only the second step information has been excluded from the task information, the second step information and step information related to the second step information may be excluded from the task information, and it may be identified whether the task is performed normally. The other step information related to the second step information may be step information including a user motion of the same type as the type of the user motion corresponding to the second step information.

In the operation S1010 of applying the first weight, a fourth weight may be identified based on the type of the user motion corresponding to the first step information, and the first weight and the fourth weight may be applied to the first step information.

In the operation S1030 of updating the task information, a preset essential step information among the plurality of step information may be maintained in the task information and the task information may be updated.

The user motion may include at least one of a scroll motion, a button click motion, an image click motion, a typing motion, or an application execution motion.

The methods according to the aforementioned various example embodiments of the disclosure may be implemented in forms of applications that can be installed on conventional electronic apparatuses.

The methods according to the aforementioned various example embodiments of the disclosure may be implemented with software upgrade, or hardware upgrade of conventional electronic apparatuses.

The aforementioned various example embodiments of the disclosure may be performed through an embedded server provided on an electronic apparatus, or at least one external server.

The aforementioned various example embodiments of the disclosure may be implemented in a recording medium that can be read by a computer or an apparatus similar to a computer, using software, hardware, or a combination thereof. In some cases, the embodiments described in this disclosure may be implemented as the processor 120 itself. According to implementation by software, the embodiments such as processes and functions described in this disclosure may be implemented as separate software modules. Each of the software modules can perform one or more functions and operations described in this disclosure.

Computer instructions for executing the processing operations of the electronic apparatus 100 according to the aforementioned various example embodiments of the disclosure may be stored in a non-transitory computer-readable medium. Such computer instructions stored in a non-transitory computer-readable medium may make the processing operations at the electronic apparatus 100 according to the aforementioned various example embodiments performed by a specific machine, when they are executed by the processor of the specific machine.

A non-transitory computer-readable medium may refer, for example, to a medium that stores data semi-permanently, and is readable by machines. As specific examples of a non-transitory computer-readable medium, there may be a CD, a DVD, a hard disc, a blue-ray disc, a USB, a memory card, a ROM and the like.

While various example embodiments of the disclosure have been illustrated and described, it will be understood that the various example embodiments are intended to be illustrative, not limiting, thus the disclosure is not limited to the aforementioned embodiments, and it will be apparent to those skilled in the art that various modifications may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
   a memory storing task information and keyword information regarding a voice recognition agent function related to execution of an application; and
   a processor connected with the memory and configured to control the electronic apparatus,
   wherein the processor is configured to:
   apply a first weight to first step information including the keyword information among a plurality of step information included in the task information,
   apply a second weight different from the first weight to second step information including a motion among the plurality of step information,
   update the task information based on the first step information to which the first weight was applied and the second step information to which the second weight was applied, and
   based on a voice command for the application being input, execute the voice recognition agent function based on the updated task information.

2. The electronic apparatus of claim 1,
   wherein the processor is configured to:
   apply the second weight to the second step information including a motion of a first type among the plurality of step information, and
   apply a third weight different from the second weight to third step information including a motion of a second type different from the first type among the plurality of step information.

3. The electronic apparatus of claim 1,
   wherein the processor is configured to:
   based on the second weight applied to the second step information being less than a threshold numerical value, exclude the second step information from the task information, and
   based on the second weight applied to the second step information being greater than or equal to the threshold numerical value, maintain the second step information in the task information.

4. The electronic apparatus of claim 3,
   wherein the processor is configured to:
   based on excluding the second step information from the task information, identify whether a task is performed normally, and based on the task being performed normally, exclude the second step information from the task information.

5. The electronic apparatus of claim 4,
   wherein the processor is configured to:
   based on the task not being performed normally in a state wherein the second step information has been excluded from the task information, maintain the second step information and exclude step information different from the second step information from the task information, and identify whether the task is performed normally,
   wherein the step information different from the second step information is step information including a motion of a different type from the type of the motion corresponding to the second step information.

6. The electronic apparatus of claim 5,
   wherein the processor is configured to:
   based on the task not being performed normally in a state wherein the second step information has been excluded from the task information, maintain the second step information and preferentially exclude step information to which a relatively low weight was applied among the plurality of step information different from the second step information from the task information, and identify whether the task is performed normally.

7. The electronic apparatus of claim 4,
   wherein the processor is configured to:

based on the task not being performed normally in a state wherein only the second step information has been excluded from the task information, exclude the second step information and step information related to the second step information from the task information, and identify whether the task is performed normally, wherein the other step information related to the second step information is step information including a motion of the same type as the type of the motion corresponding to the second step information.

8. The electronic apparatus of claim 1,
wherein the processor is configured to:
identify a fourth weight based on the type of the motion corresponding to the first step information, and
apply the first weight and the fourth weight to the first step information.

9. The electronic apparatus of claim 1,
wherein the processor is configured to:
maintain preset essential step information among the plurality of step information in the task information and update the task information.

10. The electronic apparatus of claim 1,
wherein the motion includes at least one of a scroll motion, a button click motion, an image click motion, a typing motion, or an application execution motion.

11. A method of controlling an electronic apparatus storing task information and keyword information regarding a voice recognition agent function related to execution of an application, the method comprising:
applying a first weight to first step information including the keyword information among a plurality of step information included in the task information;
applying a second weight different from the first weight to second step information including a motion among the plurality of step information;
updating the task information based on the first step information to which the first weight was applied and the second step information to which the second weight was applied; and
based on a voice command for the application being input, executing the voice recognition agent function based on the updated task information.

12. The method of claim 11,
wherein the applying the second weight comprises:
applying the second weight to the second step information including a motion of a first type among the plurality of step information; and
applying a third weight different from the second weight to third step information including a motion of a second type different from the first type among the plurality of step information.

13. The method of claim 11,
wherein the applying the second weight comprises:
based on the second weight applied to the second step information being less than a threshold numerical value, excluding the second step information from the task information, and based on the second weight applied to the second step information being greater than or equal to the threshold numerical value, maintaining the second step information in the task information.

14. The method of claim 13,
wherein the updating the task information comprises:
based on excluding the second step information from the task information, identifying whether a task is performed normally, and based on the task being performed normally, excluding the second step information from the task information.

15. The method of claim 14,
wherein the updating the task information further comprises:
based on the task not being performed normally in a state wherein the second step information has been excluded from the task information, maintaining the second step information and excluding step information different from the second step information from the task information, and identifying whether the task is performed normally,
wherein the step information different from the second step information is step information including a motion of a different type from the type of the motion corresponding to the second step information.

16. The method of claim 15,
wherein the identifying whether the task is performed normally comprises:
based on the task not being performed normally in a state wherein the second step information has been excluded from the task information, maintaining the second step information and preferentially excluding step information to which a relatively low weight was applied among the plurality of step information different from the second step information from the task information, and
identifying whether the task is performed normally.

17. The method of claim 14,
wherein the identifying whether the task is performed normally comprises:
based on the task not being performed normally in a state wherein only the second step information has been excluded from the task information, excluding the second step information and step information related to the second step information from the task information, and identifying whether the task is performed normally,
wherein the other step information related to the second step information is step information including a motion of the same type as the type of the motion corresponding to the second step information.

18. The method of claim 11, further comprising:
identifying a fourth weight based on the type of the motion corresponding to the first step information, and
applying the first weight and the fourth weight to the first step information.

19. The method of claim 11,
wherein the updating the task information comprises:
maintaining preset essential step information among the plurality of step information in the task information and update the task information.

20. A non-transitory computer-readable recording medium storing a computer instruction which, based on being executed by a processor of an electronic apparatus, makes the electronic apparatus perform an operation,
wherein the operation comprises:
applying a first weight to first step information including the keyword information among a plurality of step information included in the task information;
applying a second weight different from the first weight to second step information including a motion among the plurality of step information;
updating the task information based on the first step information to which the first weight was applied and the second step information to which the second weight was applied; and based on a voice command for the application being input, executing the voice recognition agent function based on the updated task information.

\* \* \* \* \*